June 19, 1956 D. W. MARTIN ET AL 2,750,644
QUICK RELEASE ATTACHMENT FOR SAFETY BELTS Filed Aug. 8, 1952 3 Sheets-Sheet 1

INVENTORS
Donald W. Martin
Ralph L. Holm
BY Robert M. Denning
ATTORNEY

June 19, 1956     D. W. MARTIN ET AL     2,750,644
QUICK RELEASE ATTACHMENT FOR SAFETY BELTS
Filed Aug. 8, 1952     3 Sheets-Sheet 2

INVENTORS
Donald W. Martin
Ralph L. Holm
BY Robert M. Denning ATTORNEY

June 19, 1956    D. W. MARTIN ET AL    2,750,644
QUICK RELEASE ATTACHMENT FOR SAFETY BELTS
Filed Aug. 8, 1952    3 Sheets-Sheet 3

INVENTORS
Donald W. Martin
Ralph L. Holm
BY Robert M. Dunning ATTORNEY

United States Patent Office 2,750,644
Patented June 19, 1956

2,750,644

QUICK RELEASE ATTACHMENT FOR SAFETY BELTS

Donald W. Martin, St. Paul, and Ralph L. Holm, Minneapolis, Minn.

Application August 8, 1952, Serial No. 303,284

12 Claims. (Cl. 24—201)

The invention relates to a quick release attachment for safety belts and the like wherein it is desired to provide a means of releasing safety belts, shoulder straps and other such harness with virtually no delay when it is desired to do so.

In certain types of airplanes, such as jet planes used for combat purposes, it is essential that the pilot be able to escape from the cockpit in an extremely short space of time if it becomes necessary to abondon it. Various devices have been produced for assisting this operation. For example, the pilot's seat may be forcibly ejected from the plane while the pilot is still in place thereupon. The pilot is held to the seat by means of a safety belt and usually by shoulder straps. It is essential that this harness be disengaged as the pilot is ejected from the plane in order to disengage the pilot from the seat. In view of the extremely short space of time provided for any manual disconnection of the harness, it is desirable that this operation be done automatically where ever necessary. The parachute strapped to the pilot should also be opened automatically after the pilot has been ejected. The present invention resides in the provision of an apparatus designed to accomplish these results.

A feature of the present invention resides in the provision of a clamping device forming a part of a safety belt and designed to engage a link in the belt. This clamping device may be automatically actuated to disengage the link as the pilot is ejected from the plane. Upon the disengagement of the link, all of the harness is disengaged so that the pilot is released from his connection with the seat.

A feature of the present invention lies in the provision of a clamping device which includes a pair of jaws normally biased apart and held in clamping position by means of a removable pin or similar member. By securing the pin to the body of the plane the pin may be withdrawn as the pilot and pilot's seat are ejected from the plane, thereby releasing the link which holds the safety belt and shoulder harness in place.

A further feature of the present invention resides in the provision of a clamping apparatus for engaging a link and which will positively disengage the link in open position of the clamp. It is essential that the clamping device remain closed under ordinary circumstances so that the safety belt and shoulder harness will not become accidentally disengaged. It is similarly necessary that once the clamping device is opened that there be no opportunity for the link to accidentally catch in any portion of the clamp so that the safety belt will not open.

This is extremely important as the pilot's seat is in some instances secured to the body of the plane to limit the distance of ejection. Unless the safety belt and harness is free at the time the movement of the pilot's seat is arrested, the results may well be fatal.

An added feature of the present invention resides in the simplicity with which the safety belt may be connected and disconnected. The clamping device forming the major portion of the present invention normally remains clamped and is never disengaged except for testing or in the event of emergency. Thus the link detachably clamped by the clamping means remains connected to the clamp and a separate buckle arrangement is provided for attachment with the free end of the link. This arrangement is important as it permits the shoulder straps to be slidably engaged with the link and also permits a parachute clip to be detachably connected to the normally free end of the link as the pilot assumes his position in the plane. The parachute clip is preferably held on the link in the event the pilot is ejected from the plane so as to actuate the parachute rip cord automatically.

These and other objects and novel features of the present invention will be more clearly and fully set forth in the following specification and claims.

In the drawings forming a part of the specification:

Figure 1:
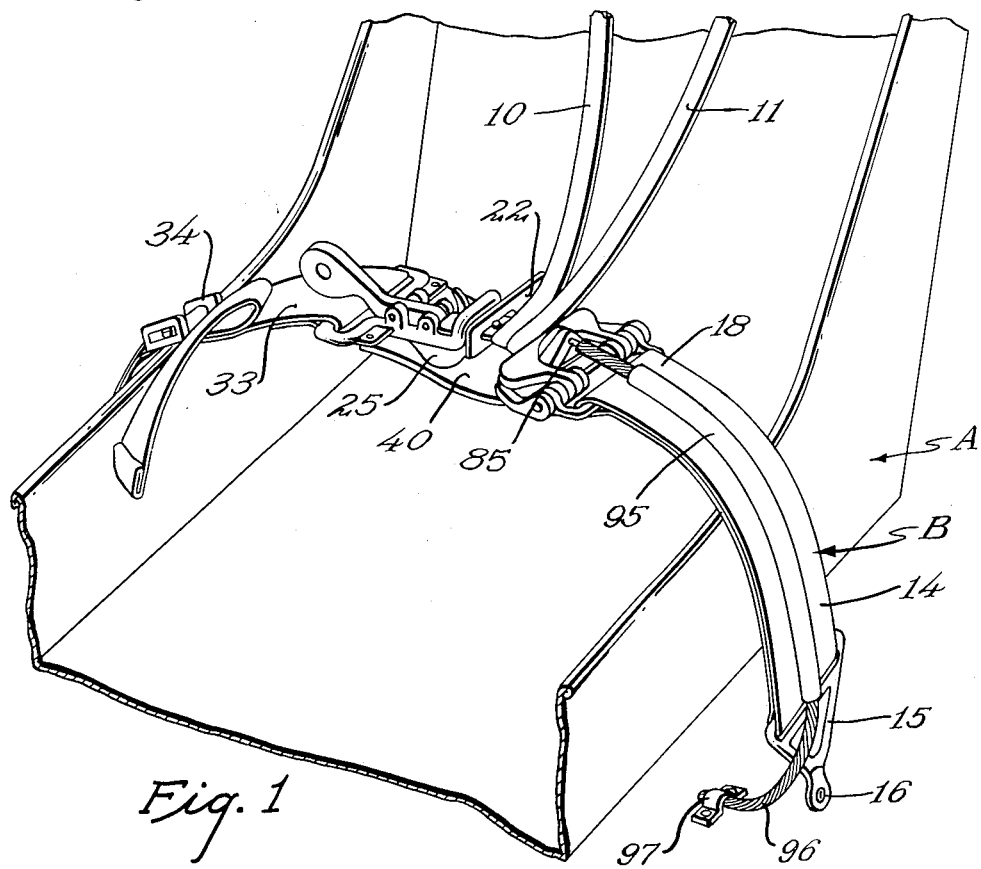
Figure 1 is a perspective view showing diagrammatically a portion of the pilot's seat with the safety belt extending across the same. Means are provided for attaching the ends of the safety belt to the seat.

The ejection seat is indicated at A in Figure 1 of the drawings. This seat is mounted upon a suitable frame work detachably connected to the body of the plane so that the entire seat will be ejected when necessary. A safety belt indicated in general by the letter B normally straddles the seat to extend over the lap of the pilot. The ends of the safety belt are anchored to the seat so that the belt is ejected therewith. A pair of shoulder straps 10 and 11 are secured to the back of the seat and are designed to extend over the shoulders of the pilot. Loops 12 and 13 are provided on the ends of the straps 10 and 11 to provide a means of disengaging the straps from the safety belt.

The belt B is shown as including an end portion 14 which is looped about a bracket 15 pivotally connected to the seat by an anchoring means extending through the pivot opening 16. The bracket 15 is provided with a transverse slot 17 through which a portion of the belt end 14 is looped. The opposite end 18 of the belt section 14 may be looped over a portion of the clamping apparatus which is indicated in general by the letter C. The clamping device C will be later described in detail.

Figure 3:
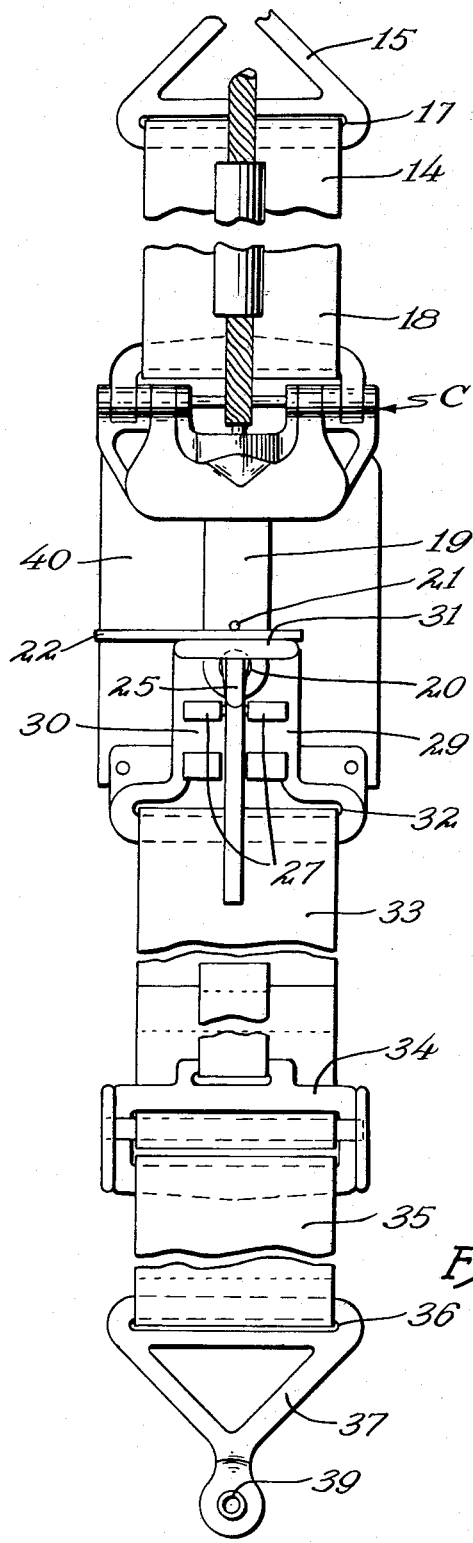
Figure 3 is a plan view of the safety belt showing the essential elements of the entire combination.
Figure 4:
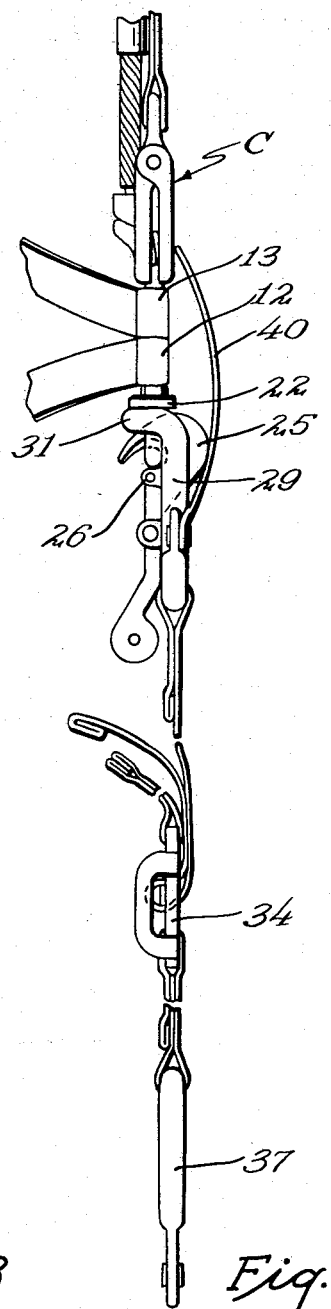
Figure 4 is a view similar to Figure 3 showing the apparatus as viewed from one side.
Figure 5:
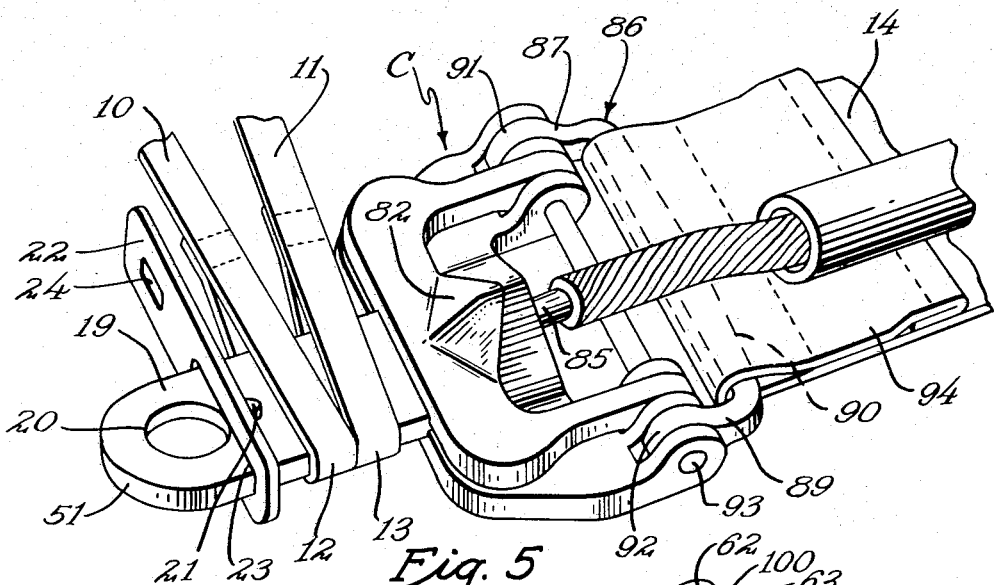
Figure 5 is a perspective view of the quick release clamping mechanism for the link just prior to the manual attachment of the safety belt.

A link 19 is normally supported by the clamping device C and projects longitudinally therefrom. As indicated in Figures 3 and 5 of the drawings, the link 19 is provided with an aperture 20 therethrough near the free end thereof. A pin 21 extends through the link 19 and projects a short distance on either side thereof. This pin is not of sufficient length to interfere greatly with the insertion or removal of the looped ends 12 and 13 of the shoulder straps 10 and 11 upon the link 19, but act as a stop for limiting the insertion of a parachute clip 22 upon the link. The parachute clip 22 comprises a flat strip of metal or other suitable material having an elongated slot 23 extending therethrough for accommodation of the link 19. An aperture 24 through one end of the link 22 provides a means for attachment with a parachute rip cord which is designed to open the parachute of the pilot after his ejection from the plane.

The aperture 20 is between the pin or shoulder 21 and the free end of the link 19. This aperture 20 is designed to accommodate the end of a hook lever 25 which forms a part of the manually detachable belt device normally used by the pilot in fastening and unfastening the safety belt. The hook lever 25 is pivotally supported at 26 between a pair of bearing bosses 27 projecting from the buckle plate 29. The buckle plate 29 includes a generally flat body portion 30 which extends beneath the apertured end of the link 19. This flat body portion 30 is apertured to accommodate the hook end of the lever 25 so that this hook lever may extend through the aperture 20 of the link 19 when the end of this link overlies the flat body 30. The buckle 29 is provided with a bridge member 31 which is off-set from the plane of the flat body 30 and is designed to bridge over the apertured end of the link. In other words, the buckle encircles the apertured end of the link at a point spaced from the extremity thereof when the hook lever extends through the link aperture 20. Means are provided to hold the hook lever in closed position so that the link will not be accidentally disengaged.

As indicated in Figures 1 and 3, the buckle 29 is provided with a transverse slotted end 32 in which a belt section 33 is looped. A belt length adjusting buckle 34 is attached to the belt length 33 to provide a means of adjusting the length of the safety belt to fit the individual pilot. The belt adjustment buckle 34 is connected to the belt section 35, which in turn is anchored in the slotted end 36 of an anchoring bracket 37 similar to the member 15. The bracket 37 is attached to the seat by a suitable fastening member extending through the eye 39 of the bracket 37. The description of the safety belt has not been given in extreme detail in view of the fact that most of the construction described is old in the art. The present invention rests mainly in the clamping member C and in its operation and connection with other parts of the apparatus. A shield 40 is secured to the buckle 29 and extends in overlapping relation with the link 19 and a portion of the clamping member C so that the operation of the mechanism will not be hindered by engagement with the clothing of the pilot and to make the safety belt more comfortable to wear.

The detail construction of the clamping element is best illustrated in Figures 5 through 9 of the drawings. The clamping member includes three main parts, one of which is indicated in general by the numeral 41 and illustrated in perspective in Figure 6 of the drawings. The clamping member 41 includes a generally U-shaped body having a pair of parallel arms 42 and 43 and a connecting member 44. The connecting member 44 is provided with a pair of recesses 45 and 46 in the inner surface thereof these recesses being near the ends of the connecting member 44 and spaced on opposite sides of the center of the clamping member. These recesses 45 and 46 are designed to accommodate the ends of compression springs which will be later described in detail. The center portion of the connecting member 44 is decreased in thickness as indicated at 47, the width of the reduced portion being substantially equal to the width of the link 19. A projection 49 of tapered form is provided centrally of the reduced thickness portion 47, this projection being of proper dimension to extend through an aperture 50 in the link 19. The link 19 has rounded ends 51 which are similar in form and the apertures 20 and 50 are arranged concentric with the radius of the link ends.

Figure 6:
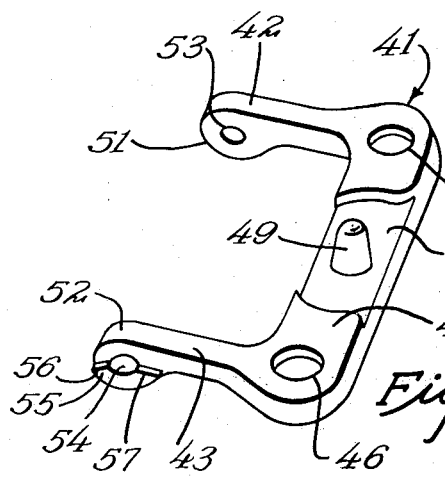
Figure 6 is a perspective view of one portion of the clamping mechanism showing the construction thereof.

The arms 42 and 43 are provided with enlargements 51 and 52 at their extremities. These enlargements are provided with axially aligned apertures 53 and 54 designed to accommodate a pivot pin which will be later described. The enlargements are provided with sector shaped projections 55 on their outer surfaces. One such projection is illustrated in Figure 6. The projections 55 are bounded by radially extending shoulders 56 and 57 which are at an angle of approximately one hundred sixty degrees apart. The purpose of the projections will be made clear later in the description.

Figure 7:
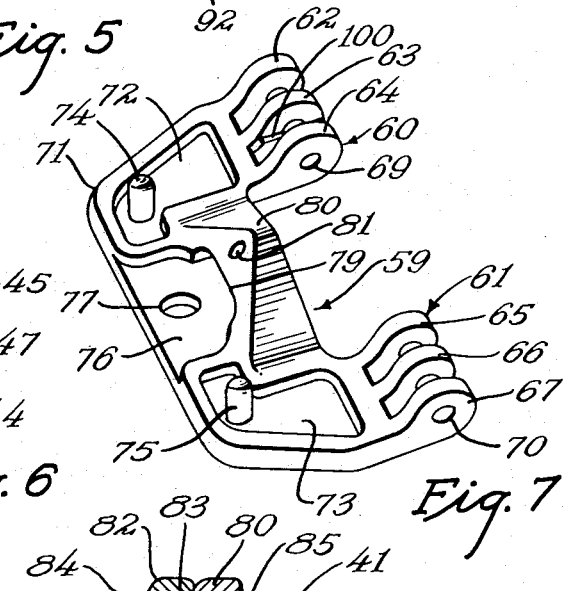
Figure 7 is a perspective view of the other main portion of the clamping mechanism.

The second main clamping member is indicated in general by the numeral 59 and is illustrated in perspective in Figure 7 of the drawings. The clamping member 59 is generally U-shaped in outline and includes parallel arm sections 60 and 61, each of which includes three separate parallel ears. The arm section 60 includes spaced ears 62, 63, and 64, while the arm section 61 includes parallel ears 65, 66 and 67. Aligned apertures 69 and 70 are provided through the ears of the arm sections 60 and 61 to accommodate a pivot pin to hingedly connect the parts of the clamping member.

The arm sections 60 and 61 are connected by a connecting portion 71 which is somewhat wider than the connecting portion 44 of the clamping section 41. The inner surface of the clamping member 59 which is illustrated in Figure 7 includes two angular recesses 72 and 73 at opposite ends of the connecting member. The recesses 72 and 73 lighten the weight of the clamping member and permit the thicker edge portions to reinforce the structure. Projecting bosses 74 and 75 extend normally from the recesses 72 and 73 and act as guides for the springs which will be later described. When the clamping member is assembled the projections 74 and 75 are aligned with the recesses 45 and 46 of the clamping member 41.

The center portion of the connecting member 71 of the clamp element 59 is provided with a reduced thickness portion 76 which corresponds in general to the shape and size of the reduced thickness portion 47 of the clamping element 41. The reduced thickness portion 76 is slightly wider than the link 19 and is designed to accommodate one end of the link. An aperture 77 extends through the center portion of the reduced thickness part 76 to accommodate the end of the projection 49 when the clamping elements are assembled.

The portion 71 of the clamping element 59 is provided with a relatively thick center portion between the reduced thickness portion 76 and the inner edge of the connecting portion. A transversely elongated pocket 79 forms an extension of the notch formed by the sides of the reduced thickness portion 76 and is designed to enclose the extremity of the link 19 in assembled condition of the clamping member. The central thicker portion 80 is provided with an aperture 81 extending therethrough, the axis of the aperture 81 being arranged on a plane normal to the axis of the pivot apertures 69 and 70 and parallel to the surface of the reduced thickness portion 76. The clamping member 41 is provided with a projection 82 which is visible in Figures 5 and 8 of the drawings, this projection fitting snugly against the outer surface of the thickened central portion 80 of the clamping element 59. The projection 82 and the cooperable projection 80 fit together along an inclined plane 83 which is so inclined as to permit the two clamping members to hinge apart without interference. In other words, from an examination of Figure 8 it will be seen that as the clamping member 41 moves in a clockwise direction relative to the clamping member 59, the mating surfaces 83 of the two projections will move apart.

The projection 82 is provided with a recess 84 which is aligned with the aperture 81 in closed position of the clamp. The aperture 81 and its continuation 84 are preferably tapered to accommodate a tapered pin 85. The pin 85 is limited in insertion so as to comprise at all times a rather loose fit within the aligned aperture and recess. This loose fit of the pin 85 is of importance in the construction as the pin must be pulled from place without excessive strain when necessary.

The third portion of the clamping member C is best illustrated at 86 in Figure 5 of the drawings. This portion of the clamping member could be integral with the element 59 if preferred. As illustrated, the clamping member 86 comprises a generally U-shaped body having parallel arms 87 and 89 and a transverse connecting member 90. The arms 87 and 89 are provided with enlarged extremities 91 and 92 which are provided with aligned recesses for accommodation of a pivot pin 93. The connecting portion 90 is designed to be looped through the loop end 94 of the belt section 14. The pivotal attachment of the member 86 to the remainder of the clamping member C permits the clamping member to conform more readily to the contour of the pilot's body and also permits the attachment of the clamping member to a previously formed loop end 94 of the belt section 14.

With reference now to Figure 1 of the drawings, it will be noted that a flexible tube 95 is secured to overlie the surface of the belt section 14. This flexible tube is designed to accommodate a cable 96 which is anchored at one end at 97 to the body of the cock pit or some other part of the plane. The cable 96 is anchored to the tapered pin 85 which holds the two parts of the clamping member in link clamping position. It will be understood that the safety belt itself is anchored to the seat, while the cable 96 is anchored to the plane. Accordingly, as the seat is ejected from the plane the cable acts to remove the pin 89, thus releasing the clamping member and allowing the same to open.

Figure 2:
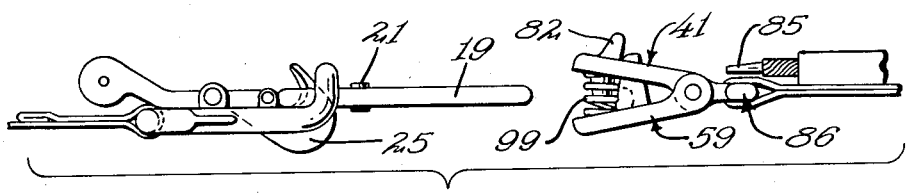
Figure 2 is a plan view of the detachable quick release clamping device, the link used in conjunction therewith, and the manually operable buckle normally used in fastening and unfastening the safety belt.
Figure 9:
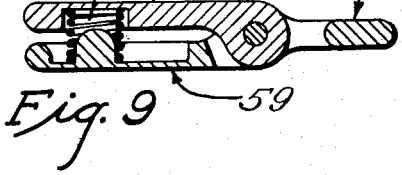
Figure 9 is a sectional view through the clamping mechanism on a plane parallel to the view shown in Figure 8.

Figures 2 and 9 of the drawings disclose springs 99 which are interposed between the two clamping members to normally urge the clamping members apart. The springs 99 encircle the projecting pins 74 and 75 of the clamping member 59 and the other end of the springs extend into the recesses 45 and 46 of the clamping member 41. The springs 99 serve the double purpose of opening the clamp when the pin 85 is removed and also supplying a shearing force upon the pin 85 which holds the pin from accidental disengagement. The springs are sufficiently strong to open the clamping member against any possible friction or other such force when the pin 85 is removed and still these springs must not apply so much force against the pin to prevent its removal when a force upon the cable 96 is exerted. The cable 96 may be of any desired length to permit the pilot and seat to travel a predetermined distance before the harness is released.

In the assembly of the clamp, the member 86 is hinged between the ears 62 and 63 of the arm portion 60 and between the ears 66 and 67 of the arm portion 61. The arms 42 and 43 of the clamping portion 41 are hinged between the ears 63 and 64 and between the ears 65 and 66 respectively.

In the course of the foregoing description it was mentioned that the enlarged ends of the arms 42 and 43 of the clamping element 41 were provided with sector shaped projections 55 which formed shoulders 56 and 57 which were substantially one hundred sixty degrees apart. The ears 63 and 66 are provided with cooperable sector shaped projections 100 which are semi-circular in outline, the ends of the projections being one hundred eighty degrees apart and extending on a plane through the axes of the pivot openings. The projections 55 of the clamping element 41 are designed to cooperate with the projections 100 of the ears 63 and 66 to limit the pivotal movement of the clamping element 41 relative to the clamping element 59. In the particular form illustrated the shoulder 56 extends at an angle of twenty degrees from the cooperable edge of the projection 100 when the clamping unit is in closed position. As a result the clamping element 41 may pivot twenty degrees before being stopped by engagement of the edges of the cooperable projections.

Thus the springs 99 can open the clamping members only to the extent of twenty degrees in the particular construction illustrated.

Figure 8:
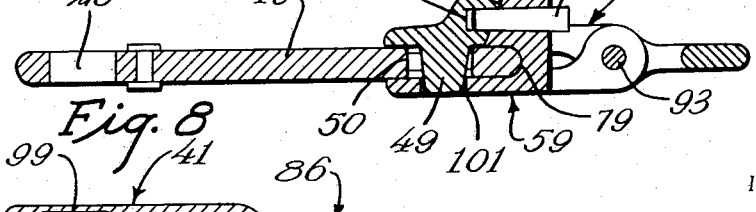
Figure 8 is a sectional view centrally through the clamping mechanism.

Figure 8 of the drawings illustrates in section the two clamping members 41 and 59 in closed position with the link extending therebetween. The link 19 fits between the clamping members in such a manner that there is no excessive play between the link and the clamping members and still there is sufficient movement to prevent the structure from being completely rigid. As the trigger pin 85 is removed from the clamping members, the springs 99 urge the two members apart. For example, the clamping member 41 will pivot in a clockwise direction relative to the clamping member 59. The projection 49 of the clamping member 41 is then withdrawn from the aperture 50 in the link 19, allowing the link to separate from the clamping members. The engagement of the rounded extremity of the link 19 in the pocket or recess 79 of the clamping member 59 prevents the link from following the movement of the projection 49 and definitely causes the projection to leave the aperture 50. Once the two clamping members have pivoted open, the projection 49 can not be retained in the aperture 50 unless the link 19 pivots outwardly from the clamped end of the link at a substantial angle to the clamping member 59. The link can not well pivot in this manner in view of the fact that the opposite end of the link is connected to the safety belt which is supported closely adjacent the body of the pilot. Furthermore, the excessive pivoting of the link within the pocket 79 is prevented. The wall of the projection 49 nearest the hinge point of the clamping members is rounded as indicated at 101 so that the link 19 will readily disengage from the projection. Furthermore, the taper of the projecting pin 49 combined with the rounded surface 101 makes it impossible for the link to remain hooked upon the projection after the clamp has opened. The general procedure in the operation of the apparatus is as follows:

The safety belt is assembled as described and the link 19 is inserted in the clamping member and the clamping member is closed. The pin 85 is then inserted to hold the clamping members in closed position. The link 19 remains secured to the clamp C, except in the event of an emergency or in the event of inspection.

The pilot is equipped with a parachute having a rip cord provided with a clip such as 22. Upon entering the plane, the pilot threads the looped ends 12 of the shoulder straps 10 and 11 onto the link 19 as shown in Figure 5. The pilot next threads the slotted parachute clip 22 onto the link 19, the distance of insertion of this clip being limited by the pin 21. The manually operable hook lever 25 is then inserted through the link aperture 20, the end of the link being first threaded between the body 30 of the buckle 29 and the bridge member 31 off-set therefrom. The hook lever 25 anchors the seat belt together. When the hook lever 25 is attached to the link 19 the parachute clip 22 will be retained on the link by the pin 21 in the event the clamp is operated to automatically disengage the pilot.

In case of an emergency, the pilot opens the cockpit hood. This may be arranged to set off mechanism to forcibly eject the seat A from the plane. When the seat has traveled a predetermined distance, the cable 96 which is anchored at 97 to the plane pulls the trigger pin 85 from the clamping unit. As soon as the pin 85 is removed, the springs 99 force the two clamping members 41 and 59 apart. As the clamping member 59 is held against the body by the safety belt, the clamping member 41 tends to rotate in a clockwise direction about the pivot shaft 93. This withdraws the projection 49 from the link aperture 50 and the link is disengaged from between the clamping members. The safety belt is thus disconnected automatically and the shoulder straps 10 and 11 are free to slide from the link. However, the parachute clip 22 can not slide from the link and remains connected thereto.

When the seat travels a predetermined distance from the plane, a cable connecting the seat to the plane arrests further movement of the seat. However, inertia tends to cause the pilot to continue in movement. Such movement is unimpeded because of the disengagement of the safety belt and shoulder strap. As the pilot travels beyond the seat, the parachute rip cord connected to the clip 22 opens the parachute and permits the pilot to descend safely to the earth.

It will be seen that the entire operation may be automatic and this is made possible in many respects by the automatic opening of the clamping members. Actual tests made with human pilots have proven that the apparatus will function safely. Exhaustive tests under simulated conditions have shown that the device is extremely dependable and can not fail to operate.

In some installations, the seat is not anchored to the fuselage of the plane. In such an arrangement, it is preferred that the seat fall free of the plane once it is ejected. When this is desired, the cable connecting the seat to the fuselage is omitted, and the trigger pin 85 remains connected by its cable 96 to the fuselage. When the pilot is released from the seat straps, and separates himself from the seat, the parachute rip cord is actuated as in the previously described arrangement.

In accordance with the patent statutes, the principles of construction and operation of our quick release attachment for safety belts have been described, and while it has been endeavored to set forth the best embodiments thereof, we desire to have it understood that these are only illustrative thereof, and that obvious changes may be made within the scope of the following claims without departing from the spirit of our invention.

We claim:

1. A releasable clamping device for disconnecting a link member from a belt, the device including a pair of clamping members connected to said belt, means pivotally connecting said clamping members along a pivot transverse to the longitudinal axis of the belt, said clamping members being designed to accommodate a portion of the link therebetween, a projection on one of the clamping members designed to extend through said link, means on the other of said clamping members to prevent the movement of the link with the projection as the clamping members are swung apart, a trigger pin extending into said clamping members and normally holding the same from pivotal movement, said trigger pin being movably supported on an axis longitudinal of the belt, and means for separating said clamping members when said trigger pin is removed.

2. The structure described in claim 1 and in which said last named means comprises resilient means interposed between the clamping members.

3. A quick detachable clamp for connecting the ends of a safety belt or the like, said clamp including a pair of clamping members, means hingedly connecting said clamping members for movement toward and away from one another, said clamping members having a recess therebetween, a link having an apertured end designed for engagement in said recess, a projection on one of said clamping members extending through the aperture of said link, resilient means normally biasing said clamping members apart, aligned projections on said clamping members having a socket extending thereinto, said socket including socket portions in both clamping members which portions are aligned when said clamping members are pivoted together, said socket being arranged with its axis at substantially right angles to the axis of said pivotal connecting means, and a trigger pin extending in said socket and normally holding said clamping members from separation.

4. The structure described in claim 3 and in which said resilient means comprise two springs arranged on opposite sides of said socket.

5. A quick detachable clamp for connecting the ends of a safety belt or the like, the clamp including a pair of clamping members pivotally connected together for movement toward and away from substantial surface contact, mating surfaces on said clamping members designed to extend together in substantial contact, said clamping members including a recess in said mating surfaces, an apertured link designed for accommodation in said recess, a projection on one of said clamping members designed to extend through the aperture of said apertured link when said link is in said recess, resilient means normally biasing said mating surfaces apart, said clamping members having a socket therein, said socket being angularly related to the direction of movement of said clamping members in pivoting toward and away from each other, and a trigger pin in said socket forming the sole means for normally holding the clamping members from pivotal movement, whereby when said trigger pin is withdrawn said clamping members will spring apart to release said link.

6. The structure described in claim 5 and in which said resilient means are interposed between said clamping members.

7. The structure described in claim 5 and including means for limiting the separation of said clamping members.

8. The structure described in claim 5 and including a pocket in said other clamping member designed to accommodate the clamped end of said link and to hold said link from movement with said projection upon separation of said clamping members.

9. An automatically releasable clamp for use in disconnecting a link member from a belt, comprising a first clamping member, means on said first clamping member for attachment with the belt, a second clamping member hingedly connected to said first clamping member on an axis transverse to the longitudinal axis of the belt, a projection on said second clamping member designed to extend into said link, the link engaging portion of said projection extending into said link being at an acute angle to the longitudinal axis of the belt in link engaging position of said clamping members to provide an inclined link engaging surface against which said link cannot remain engaged when said clamping members are hinged apart, the inclination of said link engaging surface of said projection being such as to urge said clamping members apart when a longitudinal pull is exerted against said link, and removable trigger means engaging said first and second clamping members and forming the sole means for holding the same from relative movement, whereby when said trigger means is removed longitudinal pull upon said link will urge said clamping members apart and release said link.

10. The structure described in claim 9 and including means on said first clamping member holding said link from moving with said projection as said second clamping member swings away from the first.

11. A quick release clamping device for detachably connecting two portions of a safety belt or the like, the device comprising a pair of clamping members, means pivotally connecting said clamping members for pivotal movement toward and away from each other, a link designed to extend between said clamping members for connection therewith, said link having an aperture therethrough, a projection on one of said clamping members designed to extend through the link aperture to connect the link to said one clamping member, the other of said clamping members being designed to extend against said link and to hold the same encircling said projection, means for normally biasing said clamping members apart and removable trigger means extending through portions of both of said clamping members and comprising the sole means for holding said members in clamping position, said biasing means including an inclined surface on said projection against which said link engages, said inclined surface tending to pivot said clamping members apart upon a longitudinal pull on said link, whereby when the trigger means is removed, longitudinal pull upon the link will pivot said clamping members apart and release said link from said projection.

12. An automatically releasable clamp for use in disconnecting a link from a belt, comprising a first clamping member, means on said first clamping member for attachment with the belt, a second clamping member hingedly connected to said first clamping member on an axis transverse to the longitudinal axis of the belt, a projection on said second clamping member designed to extend into said link, said link having a recess therein into which said projection may extend, said projection being supported in such a manner, and being so shaped, that a longitudinal pull on said link will tend to pivot said second clamping member out of engagement with said link and so that said link and second clamping member cannot remain engaged when said clamping members are hinged apart, and removable trigger means engaging said first and second clamping members and forming the sole means for holding the same from relative pivotal movement, whereby when said trigger means is removed, longitudinal pull upon said link will pivot said clamping members apart and release said link.

References Cited in the file of this patent

UNITED STATES PATENTS

| | | |
|---|---|---|
| 408,308 | Keller | Aug. 6, 1889 |
| 746,197 | Strickler | Dec. 8, 1903 |
| 1,275,034 | Huxley | Aug. 6, 1918 |
| 1,471,537 | Wills et al. | Oct. 23, 1923 |
| 2,275,450 | Manson | Mar. 10, 1942 |
| 2,313,397 | Rodriguez | Mar. 9, 1943 |
| 2,331,309 | Curriston | Oct. 12, 1943 |
| 2,430,985 | King | Nov. 18, 1947 |
| 2,473,554 | Warner et al. | June 21, 1949 |
| 2,591,487 | Wirz | Apr. 1, 1952 |
| 2,708,083 | Martin | May 5, 1955 |

FOREIGN PATENTS

| | | |
|---|---|---|
| 109,301 | France | of 1875 |
| 435,459 | France | Dec. 26, 1911 |